(12) United States Patent
Majer

(10) Patent No.: US 10,029,421 B2
(45) Date of Patent: Jul. 24, 2018

(54) DEVICE AND A METHOD FOR 3D PRINTING AND MANUFACTURING OF MATERIALS USING QUANTUM CASCADE LASERS

(71) Applicant: 3DM Digital Manufacturing Ltd, Yokne'am Illit (IL)

(72) Inventor: Daniel Majer, Givat Shmuel (IL)

(73) Assignee: 3DM Digital Manufacturing Ltd, Yokne'am Illit (IL)

( * ) Notice: Subject to any disclaimer, the term of this patent is extended or adjusted under 35 U.S.C. 154(b) by 320 days.

(21) Appl. No.: 14/835,748

(22) Filed: Aug. 26, 2015

(65) Prior Publication Data

US 2016/0082662 A1    Mar. 24, 2016

Related U.S. Application Data

(60) Provisional application No. 62/051,958, filed on Sep. 18, 2014.

(51) Int. Cl.
| | | |
|---|---|---|
| *B29C 64/153* | (2017.01) | |
| *B29C 67/00* | (2017.01) | |
| *B29C 64/386* | (2017.01) | |
| *B33Y 30/00* | (2015.01) | |
| *B33Y 50/02* | (2015.01) | |

(Continued)

(52) U.S. Cl.
CPC ........ *B29C 67/0088* (2013.01); *B29C 64/153* (2017.08); *B29C 64/386* (2017.08); *B29C 67/0077* (2013.01); *B29K 2105/251* (2013.01); *B33Y 10/00* (2014.12); *B33Y 30/00* (2014.12); *B33Y 50/02* (2014.12); *B33Y 70/00* (2014.12)

(58) Field of Classification Search
None
See application file for complete search history.

(56) References Cited

U.S. PATENT DOCUMENTS

| | | |
|---|---|---|
| 7,823,366 B2 | 11/2010 | Schoeneck |
| 2008/0185365 A1 | 8/2008 | Yang et al. |

(Continued)

FOREIGN PATENT DOCUMENTS

| | | |
|---|---|---|
| CN | 201023384 Y | 2/2008 |

*Primary Examiner* — Jacob T Minskey
*Assistant Examiner* — Baileigh Kate Darnell
(74) *Attorney, Agent, or Firm* — Vorys, Sater, Seymour & Pease, LLP

(57) ABSTRACT

A 3D printer device utilizing at least one Quantum Cascade Laser (QCL) image head having at least one beam focused in a focal plane of the device for building on a surface of the device a 3D model of a target object from a digital image. The inventive 3D printer is more compact in size due to the use of QCL image heads, which provides focused wavelengths of QCLs matching the absorption properties in plastics for more efficient absorption of the radiant energy. Each QCL channel power in the inventive 3D printer can be doubled by combining two lasers with a polarization beam splitter. The QCL image head is provided with Pulse Width Modulation (PWM) for compensating for imaging speed. The invention includes a method for scaling up the building speed of 3D printing regardless of detail level. The invention discloses an affordable 3D printer using QCL technology while maintaining high standards of resolution, use of quality materials, and rapid building speeds.

14 Claims, 11 Drawing Sheets

(51) Int. Cl.
*B33Y 10/00* (2015.01)
*B29K 105/00* (2006.01)
*B33Y 70/00* (2015.01)

(56) References Cited

U.S. PATENT DOCUMENTS

2009/0302503 A1* 12/2009 Ruuttu ................ C23C 14/0611
                                                          264/400
2012/0195335 A1    8/2012 Kalosha et al.
2015/0158111 A1*  6/2015 Schwarze .............. B33Y 30/00
                                                         219/121.34
2016/0279707 A1*  9/2016 Mattes .................... B41J 2/451
2016/0332370 A1* 11/2016 Arai .................... B29C 67/0077

* cited by examiner

DEVICE AND A METHOD FOR 3D PRINTING AND MANUFACTURING OF MATERIALS USING QUANTUM CASCADE LASERS

FIELD OF THE INVENTION

The present invention generally relates to the field of 3D printing and manufacturing, and more particularly, to a device and a method for 3D printing and manufacturing of plastic materials using Quantum Cascade Lasers.

BACKGROUND OF THE INVENTION 3D printing is an Additive Manufacturing (AM) or Rapid Prototyping (RP) process of making a three-dimensional solid object of virtually any shape from a digital model. 3D printing is achieved using an additive process, where successive layers of material are laid down one on top of the other. 3D printing is considered distinct from traditional machining subtractive processes techniques which mostly rely on material removal by methods such as cutting or drilling.

Relevant prior art referencing the subject of the present invention comprise patents and patent applications as follows:

US 20080185365 A1, Flatbed Laser Engraver (use of QCL laser for engraving plastics);

U.S. Pat. No. 7,823,366 B2, Apparatus and Method for Selective Processing of Materials with Radiant Energy (focus on heat-shrinking polyethylene plastic on bottle containers using QCL) [see also: WO 2006069261 A2];

US 20120195335 A1, Device Comprising a Laser (industrial material processing); and CN 200620166256 Platform-type Laser Carving Machine (focus on engraving).

Only recently 3D printing gained popularity as web-sharing and 3D printers became available and affordable by small businesses or enthusiastic home users. The great vision of producing "whatever you imagine" is still very limited due to low quality materials, low resolution, extremely slow printing speeds and cost of existing solutions.

There are two branches of 3D printing: polymers and metals. Polymers 3D printing is a widespread application. Prices range from over $1M to $1K per printer. Metal 3D printers are more of a specialty and so far remain at the high end of the market.

Current 3D printing systems suffer from many drawbacks. The majority of 3D printers today use photopolymer replacements for engineering plastic materials. These materials do not have the mechanical properties of the plastics they mimic. They have a different feel than the plastics they are supposed to replace and are very expensive. 3D printers that do use engineering plastics are mostly high end, expensive, low-resolution machines that use just one or two plastic materials from the vast array of possible plastics available. In recent years many low cost home enthusiasts 3D printers became available. They also use thermoplastics but their building quality is absolutely unacceptable for any functional purposes.

Another issue with current 3D printers is that they produce low resolution parts compared to other methods of manufacturing. Final parts do not look or feel as smooth as parts manufactured by mass production injection molding or even machining.

Finally, printing speed today is extremely slow—quite the opposite to the name 'Rapid Prototyping'. An object may take many hours or even days to print.

There are several leading 3D printing technologies dominating the market today:

1. SLS—Selective Laser Sintering systems use a plastic powder bed and selective sintering by means of a $CO_2$ laser beam (FIG. 2). Though the resulting models are made of engineering plastics (e.g. Nylon or ABS) the surface is very rough, small details are impossible to achieve due to poor $CO_2$ laser resolution and building speed is low due to vector-type imaging. The machines are very expensive due to their physical size dictated by the $CO_2$ optical path. The main manufacturers of machines of this type are 3D Systems and EOS (based in Germany).

2. SLA—Stereo Lithography Systems use UV laser for selectively curing layers of liquid photopolymer. UV lasers have a great optical quality and combined with a short wavelength allow fine resolution imaging. The resulting parts have good surface quality and fine details are obtainable. However the cured photopolymer has poor elastic and thermal quality making it impossible using the 3D printed parts as functional parts (e.g. miniature medical devices). The speed is also low due to vector imaging. The main manufacturers of machines of this type are 3D Systems, one of the earliest companies in the field of 3D printing and applications (333 Three D Systems Circle, Rock Hill, S.C. 29730, USA) and Envisiontec (Germany). DWS Lab (Zane, Italy) is an Italian manufacturer that specializes in high-end commercial laser 3D printers of the Laser Stereolithography process.

3. Inkjet Photopolymer is another way to produce 3D models by curing photopolymer layers. An array of inkjet nozzles images 2D slices of the model. A UV lamp cures the layer immediately after the imaging producing solids in imaged areas. The method was applied by Objet, recently acquired by Stratasys. Inkjet allows raster imaging and throughput scalability by increasing the number of nozzles. It produces resolution comparable to SLA though surface quality and the level of details remain worse than that obtained with SLA. Though the choice of materials offered by inkjet systems is impressive in its variety, none of them are truly functional due to the fact that these are still photopolymers with the same qualities as in SLA.

4. FDM—Fused Deposition Modeling (see FIG. 3—prior art) is based on a thermoplastic filament passing through a heated nozzle. The heat turns the plastic into soft paste. The nozzle moves in an X-Y plane, vector imaging each layer. A feed motor is responsible for pushing the filament down the nozzle in a controlled fashion. The method can produce models from engineering plastics. Its great advantage is system simplicity allowing drastic cost reductions. Some systems sell for under $1K. The drawbacks are low resolution and poor surface quality, inability to produce fine details, low throughput due to vector imaging and lack of speed scalability. The largest manufacturer for FDM systems is Stratasys whose focus is largely on industrial and commercial models. Their 3D printers are mainly used for rapid prototyping, parts production, and developing tools and jigs for fabricators.

Quantum Cascade Lasers (QCLs) were invented in Bell Labs in the middle of the 90's. QCLs are typically small (5 mm long) semiconductor lasers which have the highest single mode power of any semiconductor single mode laser (up to 5 W). They are simple to operate using low cost electronics and can be easily modulated rapidly by the electric current.

QCLs operate in a fundamentally different way than $CO_2$ lasers, such as in common use today.

Diode lasers are limited to about 2.5 μm wavelength because the wavelength is determined by the recombination energy, or bandgap, of the material system used to fabricate the device. Different material combinations result in different bandgaps, but there is a limit to the materials that can be used to make a diode laser.

Quantum cascade lasers are comprised of dozens of alternating layers of semiconductor material, forming quantum energy wells that confine the electrons to particular energy states. As each electron traverses the lasing medium it transitions from one quantum well to the next, driven by the voltage applied across the device. At precisely engineered locations, called the "active region," the electron transitions from one band energy state to a lower one and in the process emits a photon. The electron continues through the structure and when it encounters the next active region it transitions again and emits another photon. The QCL may have as many as 75 active regions, and each electron generates that many photons as it traverses the structure.

Because QCLs emit in the mid- and long-wave IR bands, they are finding new applications in precision sensing, spectroscopy, medical, and military applications. Their wide tuning range and fast response time allow for faster and more precise compact trace element detectors and gas analyzers that are replacing slower and larger FTIR, mass spectroscopy, and photo-thermal micro-spectroscopy systems.

QCLs are most commonly made of layers of InGaAs and InAlAs on an InP substrate. The lasers wavelength region is very large from the IR to THz region (3-120 micron). Its main advantage in plastic processing applications is the ability to design and manufacture QCLs with specified wavelengths in the infrared region where plastics have their absorption peaks (see FIGS. 4, 5, and 6). These lasers lend themselves to several applications in plastic manufacturing and marking by removing, heating, melting or adding material.

Thus there is a need to overcome the disadvantages in prior art devices and methods for 3D printing technology in order to achieve a more efficient and accurate outcome in printing and manufacturing, especially in plastic materials and components. There is also a need to move beyond the use of the industry standard of $CO_2$ laser technology in combination with 3D printing technology in order to broaden the scale and range of applications possible in the field.

SUMMARY OF THE PRESENT INVENTION

Accordingly, it is a broad object of the present invention to overcome the disadvantages and limitations of the prior art by providing a device for 3D printing and manufacturing of engineering plastic materials utilizing QCL image heads in a 3D printing device.

Another object of the present invention is to provide for the use of the same engineering plastics as are currently used in mass production in the plastics industry.

A further object of the present invention is to obtain the same surface quality and precision as in molded plastics by providing high printing-resolution.

Yet another object of the invention is to provide a method for scaling up the building speed of 3D printing regardless of detail level.

A further object of the invention is to provide a 3D printer that is more compact in size due to the use of QCL image heads.

Still another object of the invention is to provide focused wavelengths of QCLs matching the absorption properties in plastics for more efficient absorption of the radiant energy.

Another object of the invention is to provide a 3D printer where each QCL channel power can be doubled by combining two lasers with a polarization beam splitter.

It is a further object of the invention to provide a QCL image head with Pulse Width Modulation (PWM) for compensating for imaging speed.

It is yet another object of the invention to provide an affordable 3D printer using QCL technology while maintaining high standards of resolution, use of quality materials, and rapid building speeds.

Therefore there is provided a 3D printer device utilizing at least one Quantum Cascade Laser (QCL) image head having at least one beam focused in a focal plane of the device for building on a surface of the device a 3D model of a target object from a digital image, the device comprising:
 a powder material for building the 3D model;
 a powder pre-heating system for pre-heating the powder material for efficiency;
 a means for feeding the powder material in successive layers in a vertical (Z) direction onto the surface;
 a leveling means for leveling each of the successive layers of powder material on the surface before imaging; and
 a motorized X-Y stage upon which the QCL image head is mounted,
 wherein when the 3D printer device is connected to a computer having a 3D software program and a digital image of the 3D model and operated, the powder material is pre-heated by the pre-heating system and fed in successive layers in a vertical (Z) direction onto the surface by the means for feeding the powder material and leveled by the leveling means and the motorized X-Y stage moves the at least one QCL image head so that the at least one beam is focused in a focal plane so as to image each of the successive layers of powder material to build the 3D model in accordance with the digital image.

There is also provided a method for building a 3D model of a target object from a digital image utilizing a 3D printer device in communication with at least one Quantum Cascade Laser (QCL) image head having at least one beam focused in a focal plane, the method comprising:
 providing a powder material for building the 3D model;
 providing a powder pre-heating system;
 providing a means for feeding the powder material in successive layers in a vertical (Z) direction onto the surface;
 providing a leveling means for leveling each of the successive layers of powder material on the surface before imaging;
 providing a motorized X-Y stage upon which the QCL image head is mounted for movement of the QCL image head in an x-y plane for imaging;
 pre-heating the powder material for efficiency using the powder pre-heating system;
 feeding the powder material in successive layers in a vertical (Z) direction onto the surface using the means for feeding;
 leveling each of the successive layers of powder material on the surface using the leveling means;

moving the at least one QCL image head in an x-y plane in proximity to the by operating the motorized X-Y stage; and imaging each of the successive layers of powder material utilizing the at least one QCL image head, wherein when the device is connected to a computer having a 3D software program and a digital image of the 3D model and operated, the 3D model is built on the surface in accordance with the digital image.

wherein when the 3D printer device is connected to a computer having a 3D software program and a digital image of the 3D model and operated, the 3D model is formed on the surface in accordance with the digital image.

BRIEF DESCRIPTION OF THE DRAWINGS

For a better understanding of the invention with regard to the embodiments thereof, reference is made to the accompanying drawings, in which like numerals designate corresponding elements or sections throughout and wherein.

DETAILED DESCRIPTION OF THE INVENTION

Figure 1:
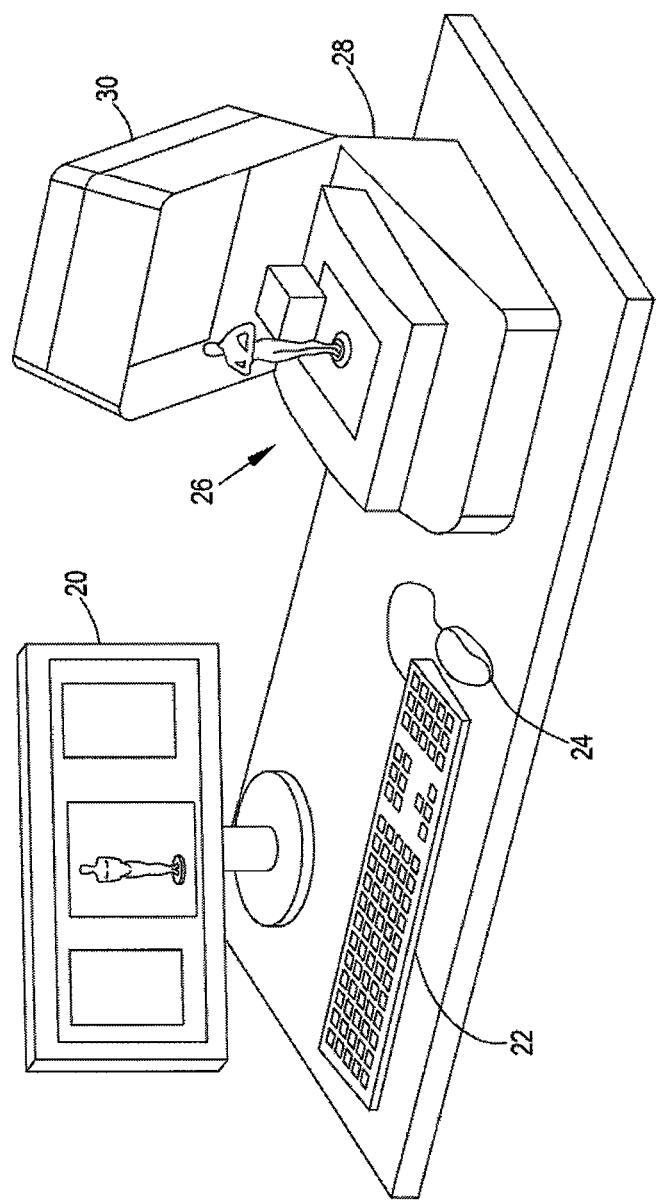
FIG. 1 is a generalized portrayal of a typical desk-top 3D printer system in accordance with the prior art.

FIG. 1 is a generalized portrayal of a typical desk-top 3D printer system in accordance with the prior art. The major components comprise a computer (not shown), a monitor 20 for working with a 3D print program (suggested by the images on the screen monitor 20), a standard keyboard 22, a mouse 24, and a desktop 3D printer 26 in a housing 28 provided with a protective lid 30. When the design for a target object has been uploaded by the computer as seen on monitor 20, and the 3D program is run, the desktop 3D printer 26 produces a three-dimensional solid of the target object from the digital model on the monitor 20 by laying down additive layers of materials within the housing 28 and fusing them together in stages in methods as are known to those skilled in the art.

Figure 2:
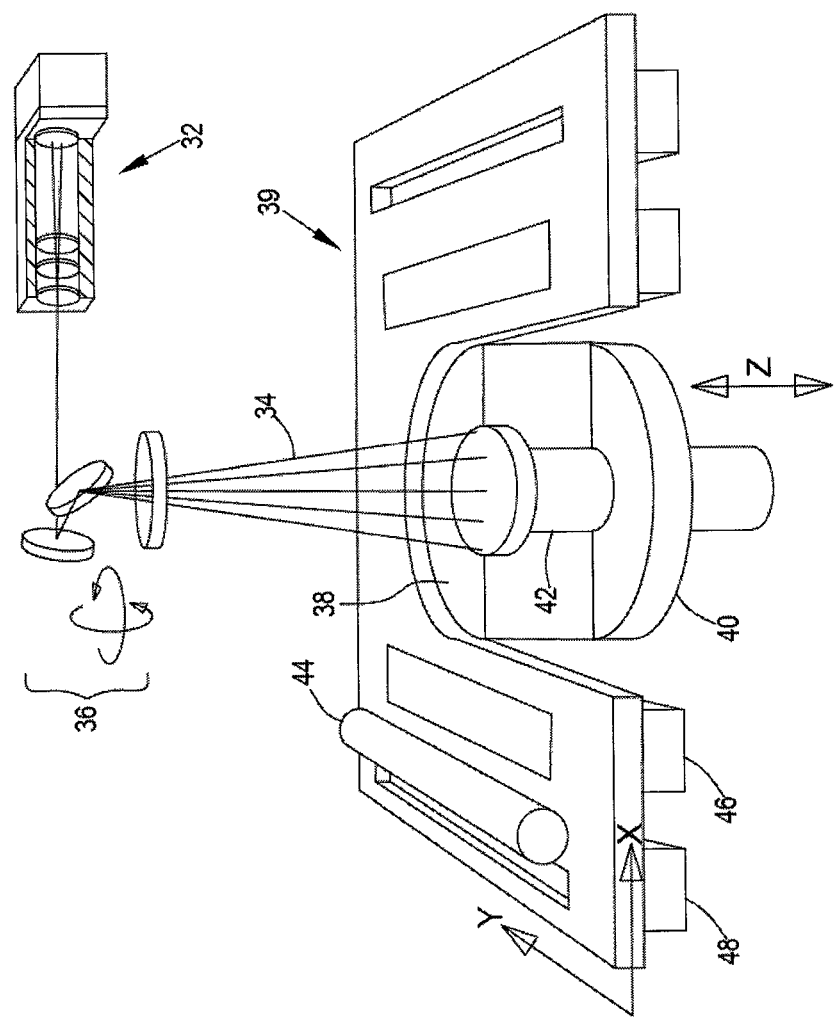
FIG. 2 is an orthographic diagram of the method of 3D printing by selective laser sintering (SLS) with a $CO_2$ laser-based process in accordance with the prior art.

FIG. 2 is an orthographic diagram of the method of 3D printing by selective laser sintering (SLS) with a $CO_2$ laser-based process in accordance with the prior art. A $CO_2$ laser provides a concentrated heating beam 34 which is controlled and directed through a system of mirrors and lenses 36 toward a target of a layer of tightly compacted, fine, heat-fusible powder 38 disposed beneath a flat-bed table 39.

The temperature in the entire chamber (not shown) enclosing the 3D printer is maintained slightly below the melting point of the powder 38 and is filled with an inert $N_2$ gas atmosphere. The beams 34 from laser 32 raise the temperature locally to cause sintering. For the next layer, a piston 40 moves down the Z-axis (double-headed arrow) along with the target object 42 and a new powder layer 38 is spread with a leveling means, such as roller 44 which passes over a feeding means, such as feed container 46. Overflow is carefully prevented using an overflow container 48. The process repeats until the full target object 42 is formed.

Figure 3:
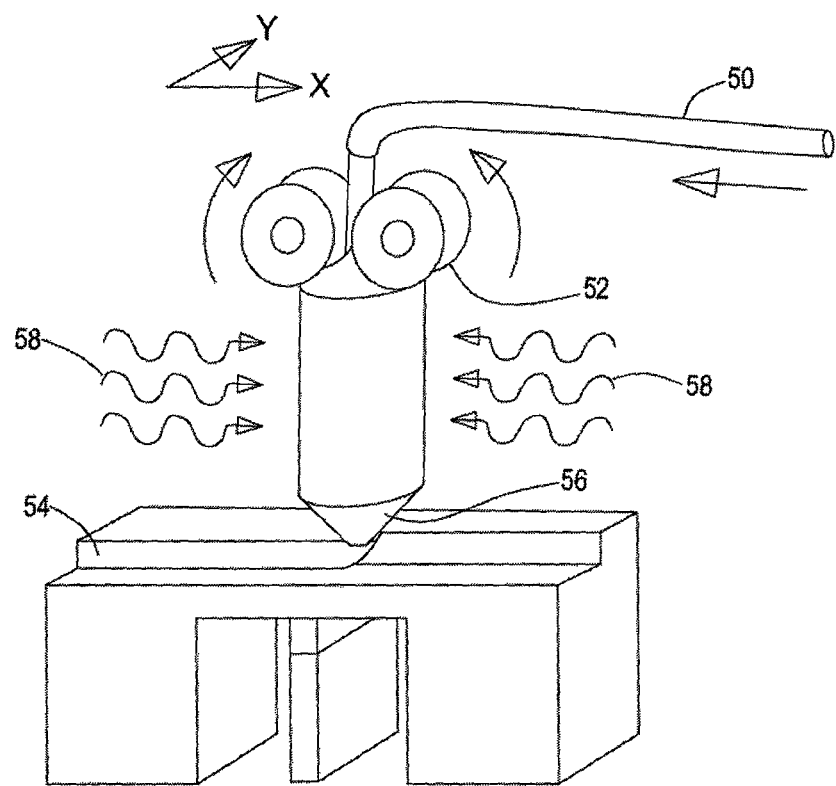
FIG. 3 is an orthographic representation of the method of 3D printing by fused deposition modeling in accordance with the prior art.

FIG. 3 is an orthographic representation of the method of 3D printing by fused deposition modeling (FDM) in accordance with the prior art. FDM utilizes at least a pair of pressure rollers 52 to squeeze out fused plastic 54 to draw each layer. A plastic filament 50 is unwound from a coil (not shown) and supplies material to an extrusion nozzle 56 which can turn the flow on and off. There is typically a worm-drive (not shown) that works with pressure rollers 52 to push the filament 50 into the nozzle 56 at a controlled rate. The filament 50 can be manipulated in the X or Y axis as needed to deposit the plastic layers 54 in accordance with the 3D software design of the 3D printer. The nozzle 56 is heated 58 (wavy arrows) to melt the material. Thermoplastics are heated past their glass transition temperature and are then deposited by the extrusion nozzle 56. The process is slow and the resolution is low. The choice of diameters for such nozzles is limited to a particular 3D printer model and depends on the support package provided by a manufacturer. The writing method is by vector imaging.

The present invention introduces an improvement over the prior art by utilizing QCLs for the printer head, either individually or in arrays to enhance the performance and in fact, out-perform the use of $CO_2$ lasers in 3D printing, in particular, using plastic materials.

Since it is known that the output wavelength of a laser is determined by the structure of the layers rather than the lasing material, device fabricators can tailor the wavelength in a way that can't be achieved with $CO_2$ lasers. While standard diode laser output wavelength is limited to ~2.5 µm, QCLs operate at much longer wavelengths: mid-wave infrared production devices up to 11 µm are available, and some 25 µm emitters have been made on an experimental basis. This transmission range is useful because of the large number of absorption lines exhibited by common target gases that fall within this band (see FIG. 4).

Figure 4:
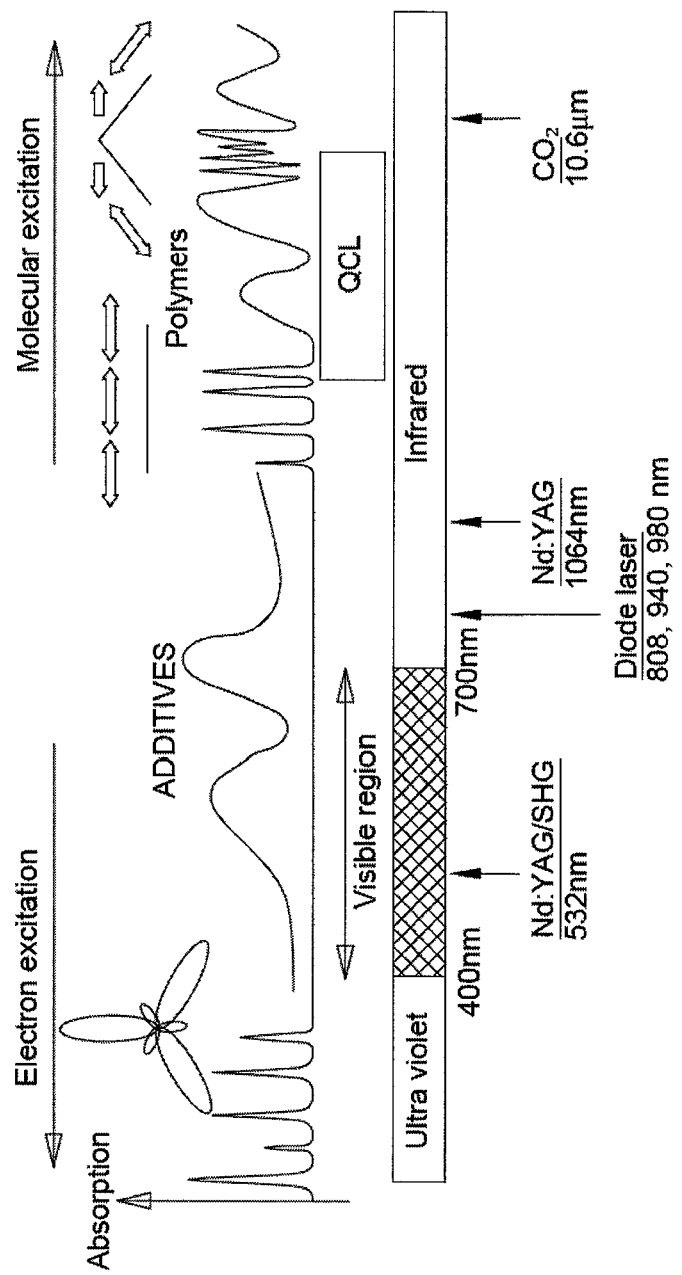
FIG. 4 is a schematic diagram showing absorption peaks of plastic materials at different wavelengths.

FIG. 4 is a schematic diagram showing absorption peaks of plastic materials at different wavelengths, primarily in the UV and infrared (IR) regions. The device and method of the present invention focus on the infrared region between 2 and 16 microns since this range shows many absorption peaks. When a suitable laser source has the same wavelength as the absorption peak of the material, the laser energy is efficiently absorbed in the material. Several wavelengths are shown, by way of example, such as diode lasers near 808, 940, 980 nm and Nd:YAG laser at 1064 nm. No absorption peaks are present at these wavelengths. $CO_2$ laser at 10.6 μm is absorbed in plastics, but not very efficiently. QCLs can be tailored to fit any wavelength in the relevant infrared plastic absorption peak region as shown by the region marked QCL.

Figure 5:
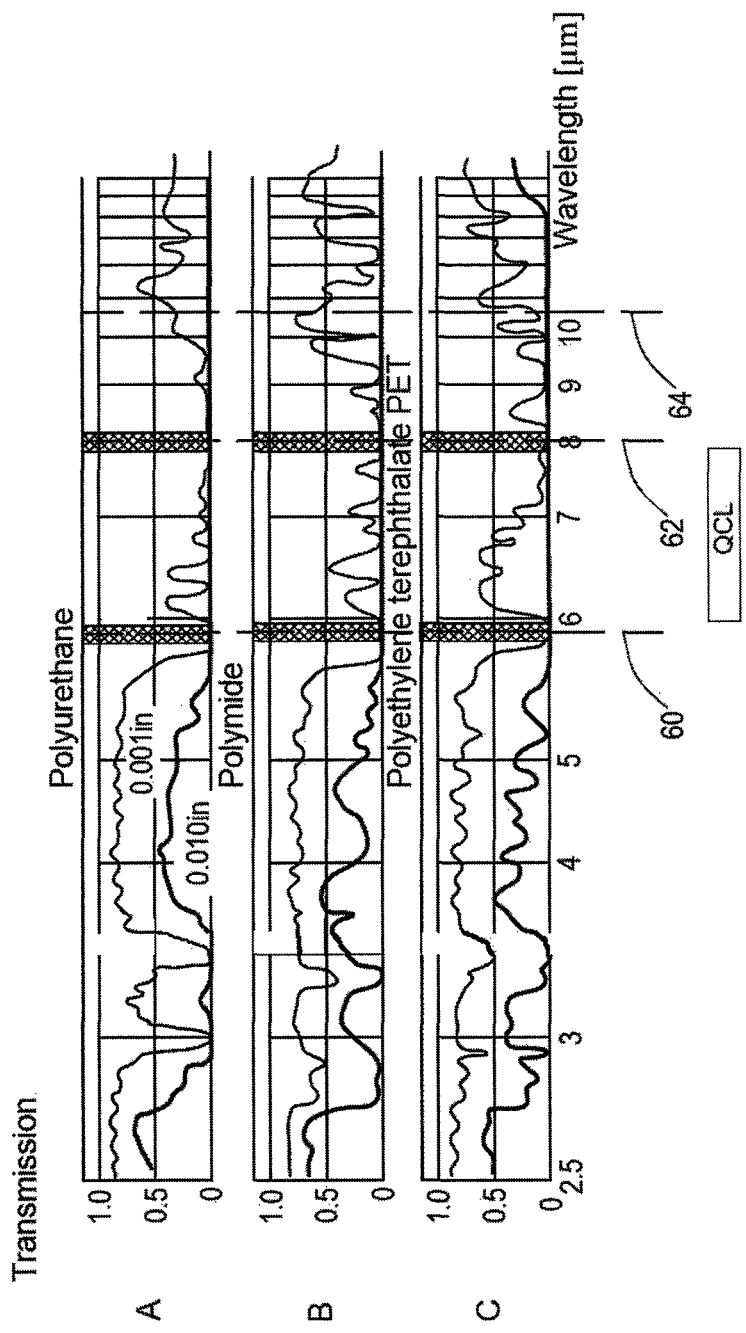
FIG. 5 illustrates three transmission spectra of sample plastic materials showing low and inefficient transmission dips in the infrared using a $CO_2$ laser as in the prior art.

FIGS. 5A/B/C illustrate three transmission spectra of sample plastic materials in the infrared. The sample transmission dip 60 at about 6 microns and dip 62 at about 8 microns are common to all three materials and the transmission is much lower than the transmission dip 64 for the 10.6 micron wavelength of a $CO_2$ laser. Quantum Cascade Lasers that match these spectral absorption dips are most efficiently absorbed in the plastic material. FIG. 5A shows the spectra for Polyurethane plastic, FIG. 5B is that of Polyimide plastic, and FIG. 5C is for Polyethylene Terephthalate (PET) plastic. In each case, transmission dips occur at lower wavelengths than a $CO_2$ laser.

Figure 6:
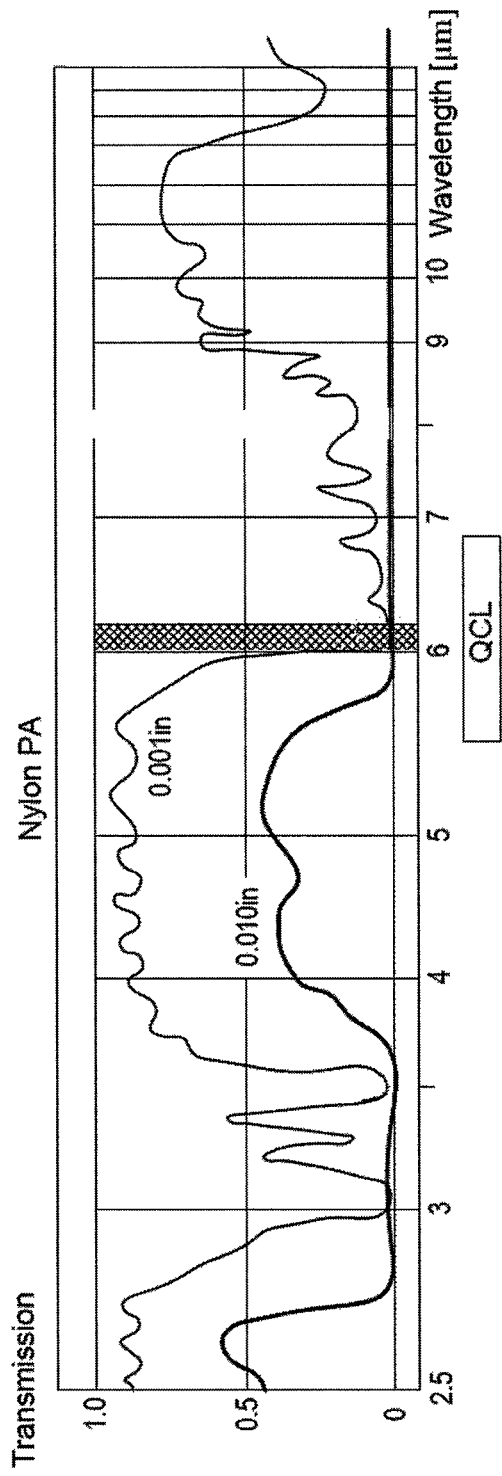
FIG. 6 illustrates the nylon transmission spectra from 2.5 to 16 microns, which shows the superior performance of QCLs over $CO_2$ lasers in this range.

FIG. 6 illustrates the nylon transmission spectra from 2.5 to 16 microns, which shows the superior performance of QCLs over $CO_2$ lasers in this range. Until recently there were no lasers in wavelengths suitable for absorption in plastics in the IR (2.5-16 micron range) except for $CO_2$ lasers near 10.6 microns. This gap in laser spectrum is now covered by QCLs whose wavelengths are below that of $CO_2$ lasers between 3.7 and 10 microns. A very low transmission band near 6 micron marked QCL is shown in FIG. 6. This band allows for superior absorption, speed and much higher resolution of the 3D printed object compared to one printed by a $CO_2$ laser at 10.6 microns.

Figure 7:
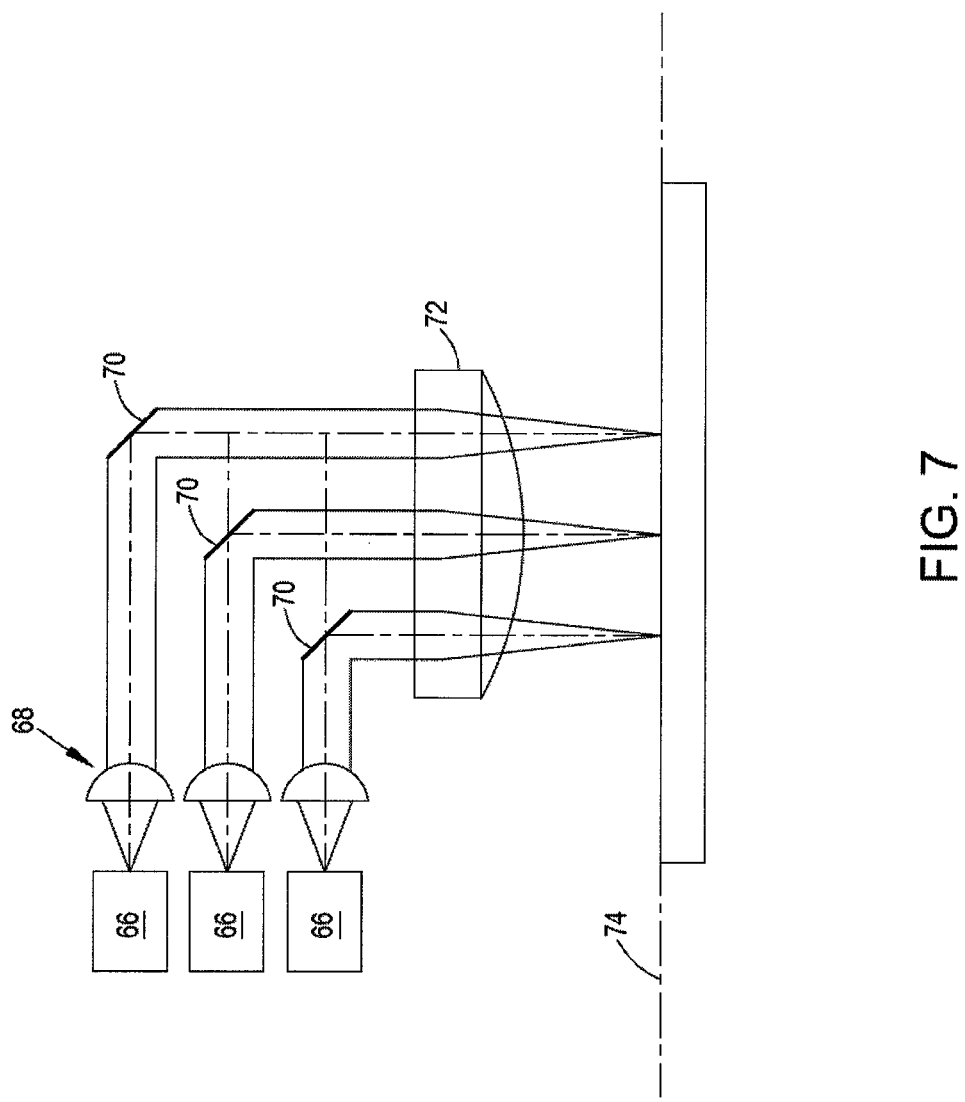
FIG. 7 shows a schematic of a multi-beam QCL image head projection as in the present invention.

FIG. 7 shows a schematic of a multi-beam QCL image head projection as in the present invention. An array of QCL 66 projects multiple beams through corresponding lenses 68 which are redirected by a mirror system 70 to enter a single lens 72 that focuses the multiple beams on a focal plane 74 for targeting powder material 38 in a 3D printer (as in FIG. 8A).

QCL compact package size allows producing a compact multi-beam head that has not been possible before. The multi-beam head can be made using individual lasers, laser arrays, and individually addressable QCL arrays.

Figure 8A:
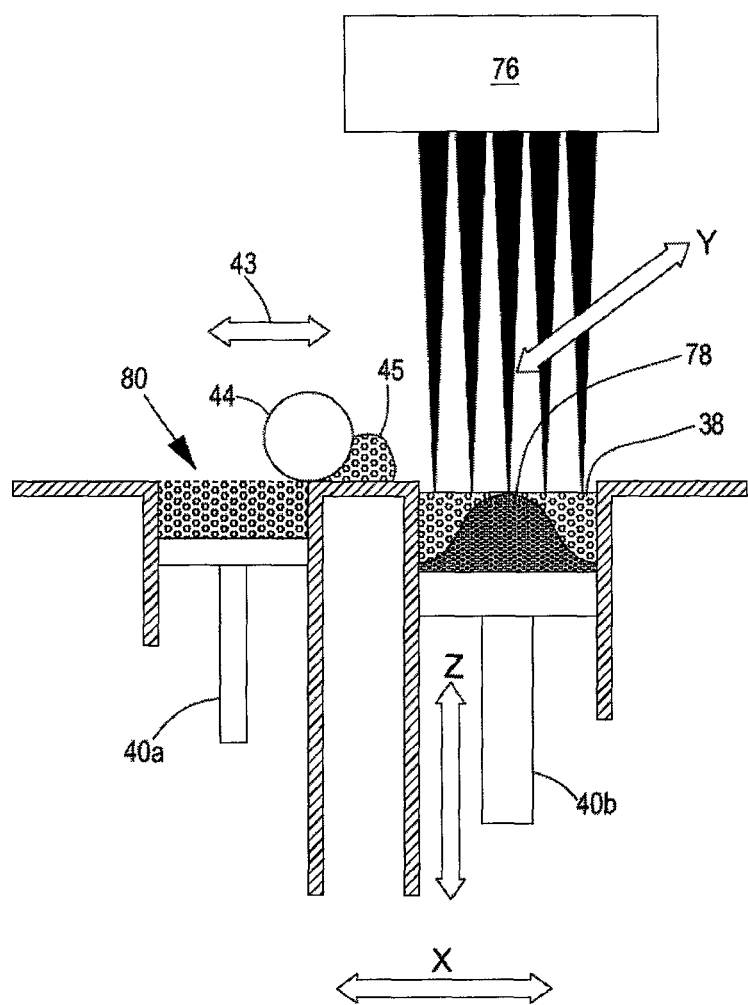
FIG. 8A shows a generalized diagram of a QCL multi-beam image head operated in raster scanner mode using the process of Selective Laser Sintering (SLS)

FIG. 8A shows a generalized diagram of a multi-beam QCL image head operated in raster scanner mode using the process of Selective Laser Sintering (SLS). The multi-beam QCL image head 76 enables high resolution and high speed operation of 3D targeted parts and objects, unlike in the prior art method of operation shown in FIG. 2 using a single beam $CO_2$ laser head 32. The $CO_2$ laser-based process is used today to produce 3D plastic models. Using a single beam laser 32 requires a scanning mirror system and f-theta optics 36. Using single beam vector writing slows down each layer production, increases machine-size and cost, and limits the spot size/resolution to min. 150 μm. Using QCLs, small, inexpensive 3D printers that 3D print using low-cost engineering plastics are possible as well as high-speed, large machines.

$CO_2$ lasers are inherently inefficient at the absorption spectra bands in the infrared (see FIG. 4) which are necessary for efficient processing of thermoplastic materials. QCL has better resolution because of shorter wavelength, excellent beam quality and lower thermal dissipation due to good absorption in plastics.

Referring now to FIG. 8A in detail, at least one multi-beam QCL image head 76 moves along the Y axis (arrow) to selectively heat compact plastic powder 38 so as to form a 3D part 78 for a targeted object in accordance with a digital software design on a computer (not shown). A leveling means, such as a roller 44 (or other leveling system) moves a portion 45 of added material in repeated cycles of operation shown by arrow 43. To add another layer to part 78, piston 40a moves upward incrementally to feed roller 44. At the same time, piston 40b moves downward the same increment as needed to add the new layer of material, such as plastic powder 38. The device has three-degrees of freedom to move in the X, Y, or Z-axis to accommodate different configurations of the 3D part 78. The power feeding system, such as pistons 40a and 40b, can also be realized by means of a powder container (not shown) passing above the model piston tray 80 and evenly dispensing powder 38 on tray 80. In this case the dispensing still requires subsequent leveling (rolling or wiping) action to produce a flat surface for laser imaging.

Figure 8B:
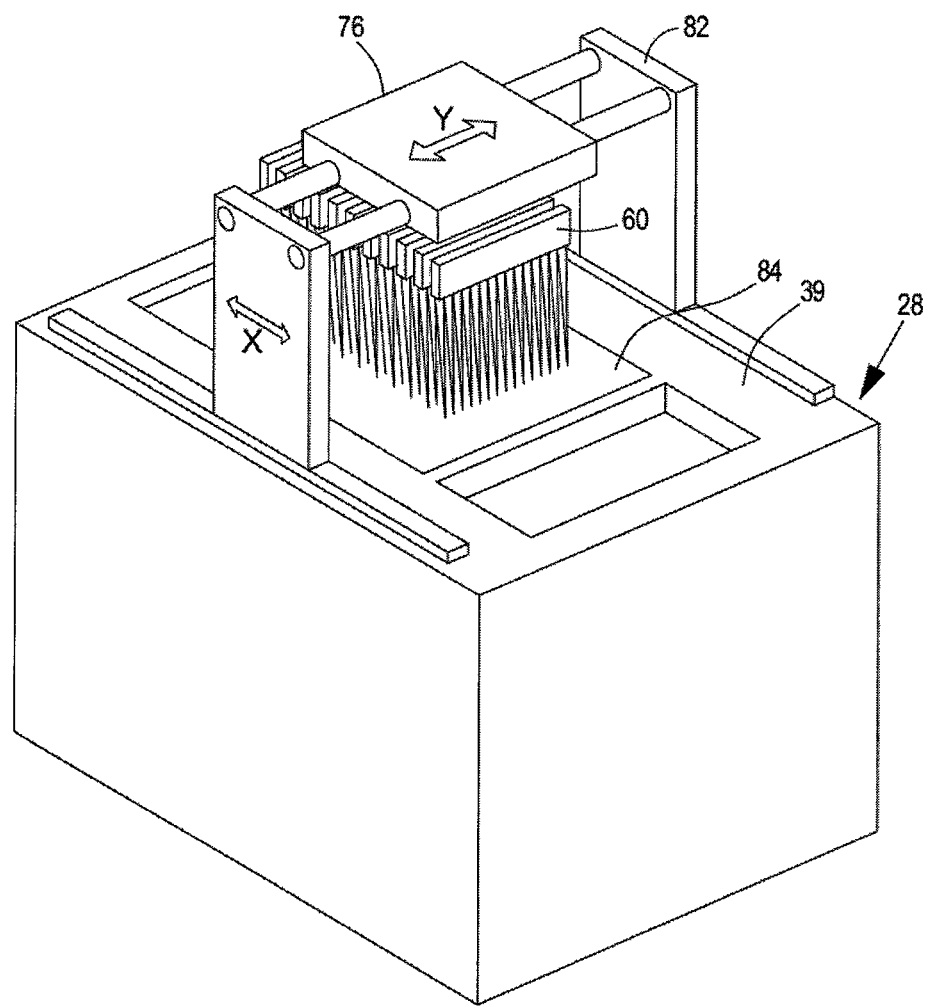
FIG. 8B shows an orthographic view of the process from FIG. 8A enabling scalability.

FIG. 8B shows an orthographic view of a multi-beam quantum cascade laser (QCL) head enabling high-resolution printing and processing of engineering materials in 3D by the method illustrated in FIG. 8A. It should be noted that a multi-beam QCL image head can contain a combination of QCLs having different wavelengths, each one optimized for different material. Thus a multi-beam, multi-wavelength QCL image head 76 can image simultaneously on a mixture of several materials or process layers containing different materials.

The 3D printer 28 in FIG. 8B is designed with a carriage holder 82 for a multi-beam QCL image head 76. The carriage holder 82 enables smooth planar motion in the X or Y axis along the surface 39 of 3D printer 28 above a materials work area 84 so as to accommodate variable sizes and volumes of targeted 3D products and parts. Preferred materials are thermoplastics with engineering strength to produce manufactured products in 3D. The carriage holder 82 bears not only multi-beam QCL image heads 76, but also inkjet heads (not shown) for color dying of successive layers of processed thermoplastic materials as the materials work area is raised by a piston (see FIG. 8A, 40b). The pitches for the inkjet head and the multi-beam QCL image head 76 are matched to assure an accurate registration between colored map and 3D geometry. Each layer is sintered and dyed.

Using an array of multi-beam QCL image heads 76 allows raster scanning as in an inkjet printer. For raster imaging, a Pulse Width Modulation (PWM) feature (not shown) is used to reduce "banding" effects by pseudo random PWM modulation. Power is relatively easy to control utilizing very fast, 10-100 ns pulses.

If vector imaging is used in SLS, accelerations and decelerations of the imaging beam produce uneven heating of the powder 38 (see FIG. 8A) in the materials work area 84. This results in image artifacts, swollen corners, and the like. In $CO_2$ it is difficult to dynamically control the power due to low modulation frequency. In QCL the imaging power can be matched to imaging speed by modulating the power as explained above. Thus all imaged areas can be exposed with the same energy forming a smoother printed object.

Other advantages of QCL include: compact size, fast layer-processing regardless of detail level, high resolution due to QCL wavelength and excellent beam quality along with excellent absorption in plastics.

Figure 9:
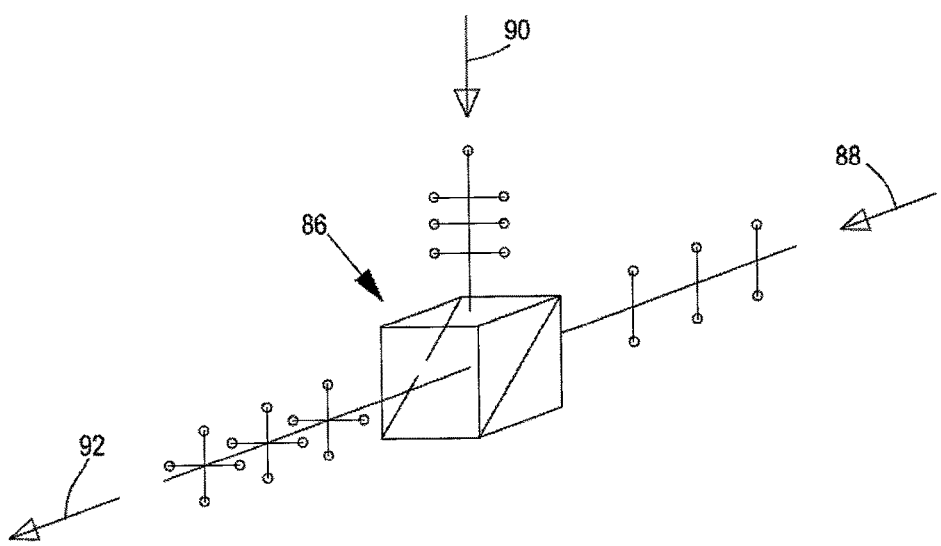
FIG. 9 is a figurative diagram of pathways for combining two QCLs with a polarization beam splitter for achieving power doubling.

FIG. 9 is a schematic diagram of pathways for combining two QCLs using a polarization beam splitter 86. Each QCL channel power can thus be doubled. Beams 88 from a first QCL (signified by elongated arrow) is rotated 90 degrees by beam splitter 86 so as to produce a secondary beam 90. The two beams 88 and 90 are recombined to form a beam 92 which has double the power of the individual constituent beams 88, 90.

Figure 10:
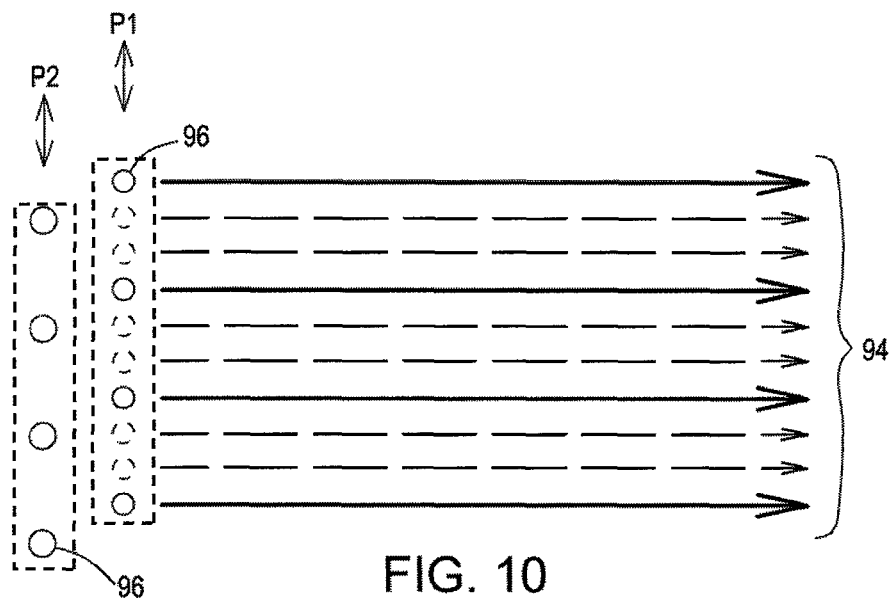
FIG. 10 is a schematic diagram of an imaging method for interleaving image pathways with a QCL multi-beam printing head to smooth laser imaging in raster mode.

FIG. 10 is a graphic representation of a method for interleaving image pathways with QCL to smooth laser imaging in raster mode. Since a QCL is a compact semiconductor laser, it allows packaging an array of beams 94 in a small-sized image head 66 (see FIG. 7). This arrangement produces a line of image spots 96 of typically a few tens of microns in diameter, and millimeters scale pitch. Heretofore, when imaging in raster mode the pitch produced gaps (dashed lines which also show beam pathways) between the scan lines (thick lines). As shown in FIG. 10, a multi-beam QCL image head (not shown) solves this problem by interleaving imaging so as to fill in these gaps (shown by dashed lines). The normally skipped pathways (dashed lines) are advantageously covered in raster mode as the printing (or imaging) head is minutely adjusted from pitch p1 to a new pitch p2 between laser image spots 96.

Figure 11:
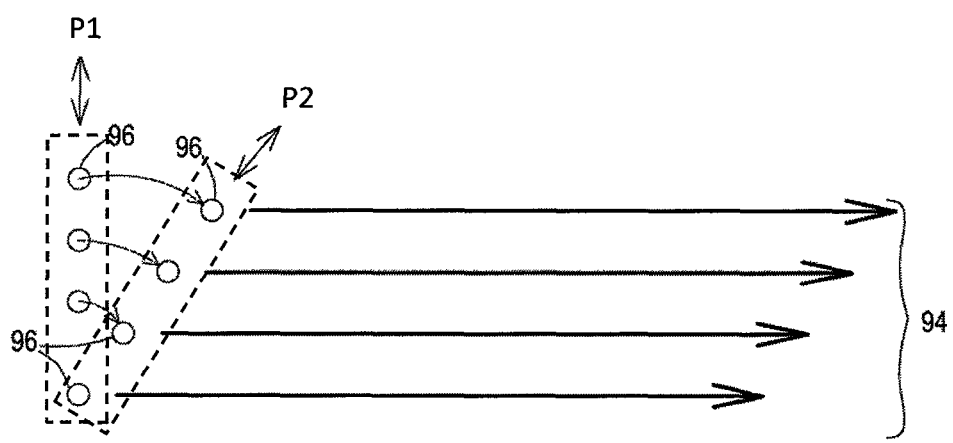
FIG. 11 shows a second imaging method to more completely cover a work area in a 3D printer by adjusting the pitch of a QCL multi-beam printing head at a tilted angle in raster mode so that the printing head beams are adjacent one to another.

FIG. 11 shows a graphic representation of a second method to more completely cover a work area in a 3D printer by adjusting the pitch of a multi-beam QCL image head at a tilted angle in raster mode so that the interval between printing head pathways is narrowed. By tilting the multi-beam QCL image head (not shown) from pitch p1 to a tilted pitch p2, the distance between beams (dark arrows) is narrowed to produce sharper and more accurate images while operating the 3D printer.

It will therefore be appreciated that the device described herein and illustrated in the accompanying drawings is set forth merely for purposes of example and that many other variations, modifications, and applications of the present invention may be made. Having described the present invention with regard to certain specific embodiments thereof, it is to be understood that the description is not meant as a limitation, since further modifications may now become apparent to those skilled in the art, and it is intended to cover such modifications as fall within the scope of the description and the appended claims.

I claim:

1. A method for fabricating a 3D object, said method comprising:
   directing a quantum cascade laser (QCL) beam to at least one predetermined region of a layer of a first material positioned in the pathway of the beam, to sinter or melt said first material in said at least one predetermined region, to form a first cross-section of said object;
   forming a layer of a further material on said first cross-section and directing a QCL beam to at least one predetermined region of said layer of the further material, to sinter or melt said further material in said at least one predetermined region to form a further cross-section of said object;
   forming one or more material layers, each being successively sintered or melted by QCL to form stacked cross-sections of said object;
   wherein the QCL beam is programmable or engineered to operate at a wavelength selected to match the absorption spectrum of said first and further materials;
   to thereby successively fabricate the 3D object.

2. The method according to claim 1, wherein said first and further materials are independently selected from the group consisting of thermoplastic and thermosetting materials.

3. The method according to claim 2, wherein said first and further materials are selected from thermoplastic materials.

4. The method according to claim 1, wherein said first and further materials are powders.

5. The method according to claim 4, further comprising pre-heating said first and further powder materials.

6. The method according to claim 1, wherein said first and further materials are selected from the group consisting of Nylon (Polyamide), PET, polyimide, polyurethane, acrylonitrile butadiene styrene (ABS), acrylic (PMMA), polyester, polyethylene (PE), polypropylene (PP), polyvinyl acetate (PVA), polystyrene (PS) and polyvinyl chloride (PVC).

7. The method according to claim 1, wherein said QCL is operable in 3D raster mode.

8. The method according to claim 1, wherein said QCL is utilized in combination with an inkjet.

9. The method according to claim 1, wherein said QCL beam is emitted from one or more QCL image heads.

10. The method according to claim 1, wherein said one or more QCL image heads utilizes Pulse Width Modulation (PWM).

11. The method according to claim 1, wherein said one or more QCL image heads provides for simultaneous writing with more than one wavelength.

12. The method according to claim 1, further comprising removing uncured material to expose the 3D object.

13. The method according to claim 1, utilizing a QCL image head having at least one beam focused in a focal plane of said material layers.

14. The method according to claim 1, further comprising providing means for feeding said first and further materials in successive layers.

* * * * *